O. MOLL & P. KUSCHEWITZ.
ELECTRIC TELEGRAPHY.
APPLICATION FILED APR. 25, 1914.
1,257,913.
Patented Feb. 26, 1918.
2 SHEETS—SHEET 2.
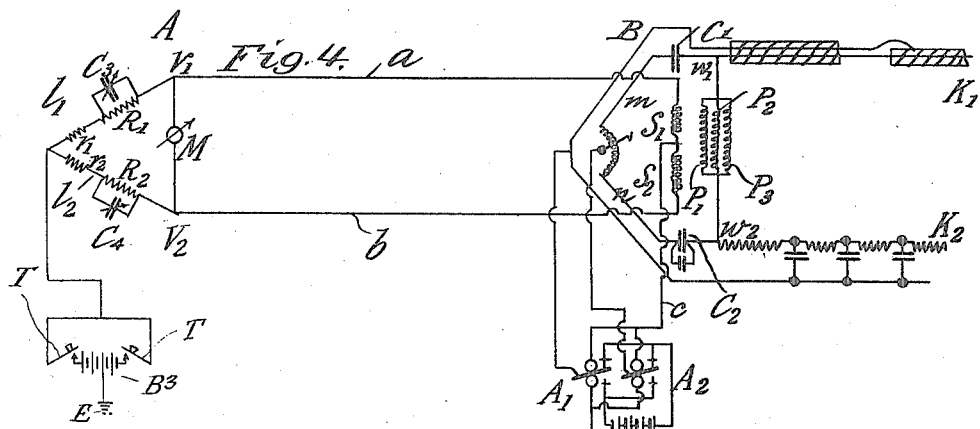
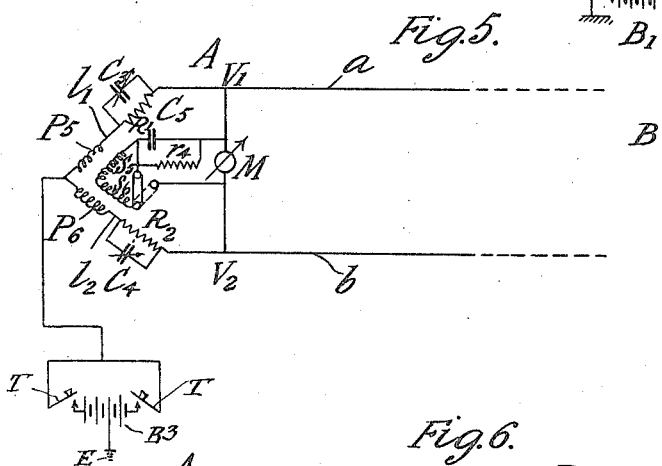
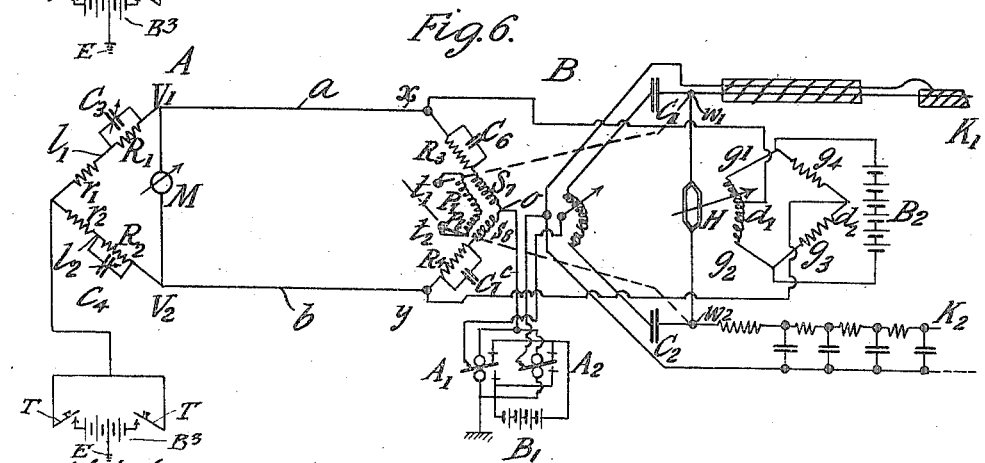
Witnesses:
M. E. McDade
Inventors
Oskar Moll
Paul Kuschewitz

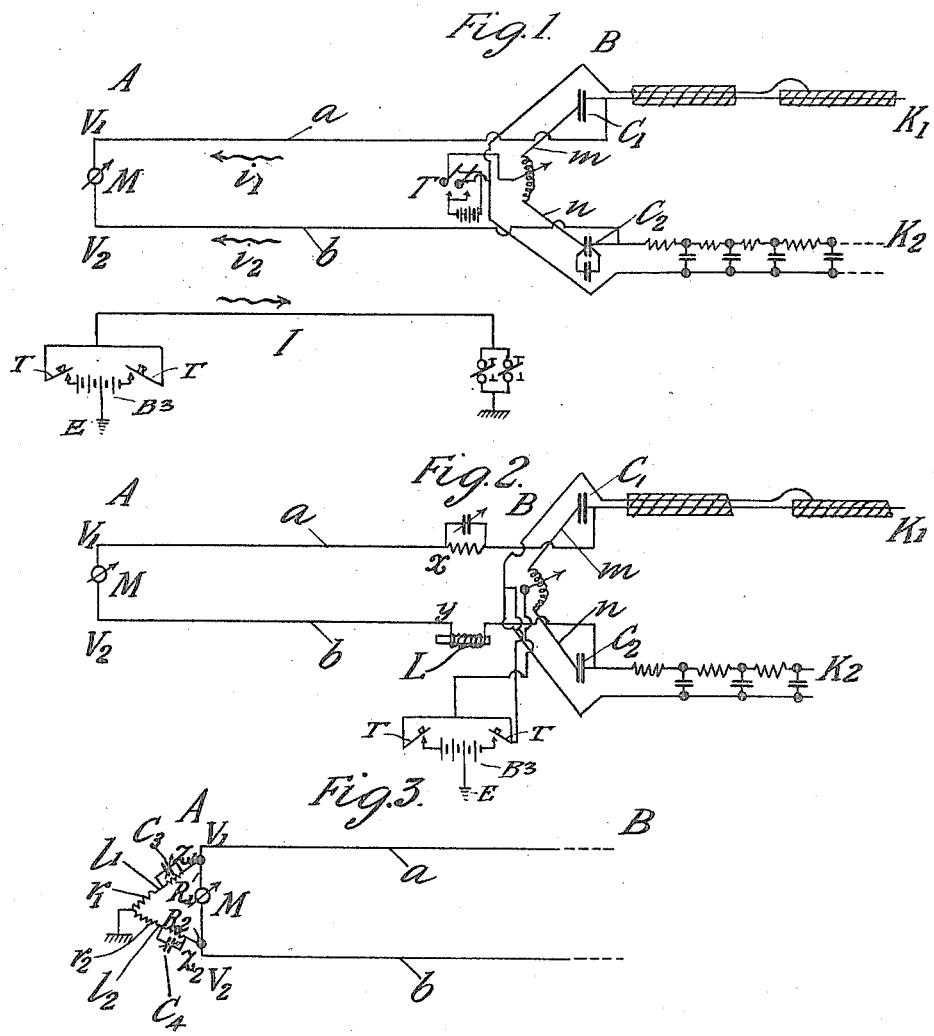

UNITED STATES PATENT OFFICE.

OSKAR MOLL AND PAUL KUSCHEWITZ, OF BLACKHEATH, ENGLAND.

ELECTRIC TELEGRAPHY.

1,257,913.  Specification of Letters Patent.  Patented Feb. 26, 1918.

Application filed April 25, 1914. Serial No. 834,478.

*To all whom it may concern:*

Be it known that we, OSKAR MOLL, a subject of the King of Great Britain, and PAUL KUSCHEWITZ, a subject of the King of Prussia, both residing in Blackheath, England, and whose post-office address is 75 Charlton road, Blackheath, in the county of Kent, England, have jointly invented certain new and useful Electric Telegraphy, of which the following is a specification.

In the specification of our United States Patent Application, Serial No. 769,298, methods are described for protecting telegraph and like wires against inductive action from neighboring circuits, by the insertion of primary coils or other protecting devices in the disturbing circuit. Since it is not always possible or convenient to obtain access to the disturbing circuit for this purpose, in the present invention means are devised by which these disturbances can be eliminated without any access to the said disturbing circuit. The arrangements are more particularly suitable for submarine cables and are illustrated in the accompanying examples as applied to this purpose, but they are also adaptable to eliminate disturbing influences in telephone or other lines provided with sensitive receiving instruments.

In the accompanying drawings, examples are shown diagrammatically of the circuit arrangements of a submarine cable adapted for duplex working. Figure 1 represents a usual known arrangement. Figs. 2 to 6 represent circuit arrangements according to the present invention. Similar parts are denoted by the same reference letters in all the figures.

In order to protect submarine cables or other lines as far as possible from disturbing currents it is usual to lead the cable to a station in a district free from disturbance and then from this place, where the artificial cable required for duplex working can also be installed, to continue the circuit as a double line through the district in which the disturbing elements are present to the receiving station itself. Fig. 1 shows a known arrangement of this kind, in which A is the receiving station, containing the receiving instrument M, B the station to which the cable is led, $a$ and $b$ the double line between the stations A and B. T is a double current key for signaling from station B over the submarine cable. $C_1$ and $C_2$ are condensers inserted in the working and artificial cables, $m$ and $n$ the arms of the bridge to which the key T is connected, $K_1$ and $K_2$ represent the working and artificial cables.

That this known arrangement does not eliminate all disturbances in the circuit of the double line, may be easily seen from the following considerations:

The disturbing current I produces currents $i_1$ and $i_2$ in the two branches $a$ and $b$ of the double line between A and B and voltages $V_1$ and $V_2$ at the terminals of the receiving instrument M. The latter can only be unaffected by the disturbing current, if the instantaneous values of the phase and intensity of the currents $i_1$ and $i_2$ or of the voltages $V_1$ and $V_2$ produced by these currents are always the same. This assumes that the double lines are both at the same mean distance from the disturbing currents and also that the capacity resistance and self inductance of the line $a$ with the cable connected to it and the arm $m$ of the bridge are exactly equal to the corresponding values of the line $b$ with the artificial cable and the arm $n$ of the bridge. But this would only be possible when the bridge was balanced with equal arms ($m=n$ and $C_1=C_2$). A balance cannot in general be obtained with equal arms in the bridge and we therefore provide novel means which will prevent disturbances and at the same time allow the bridge arms to be adjusted as required.

Arrangements have been proposed by which a third conductor is carried through the disturbed district for the purpose of compensating electrostatic disturbances and is connected at the receiving instrument to a balancing capacity and resistance, but in the system according to the present invention, such third conductor is not required.

It has also been proposed, where there is a single line between the receiving instruments at each end of a duplex cable installation to earth each side of the instruments over a resistance and a capacity, which are adapted to compensate disturbing influences of given strength and frequency, but the known arrangement differs considerably from the method of the present invention by which such shunt circuits are avoided and in which the double line over the disturbed district is rendered immune from disturbing influences of any strength or frequency.

According to the present invention, in one arrangement, in which the double line is directly connected to the cable, means are provided for equalizing the voltages $V_1$ and $V_2$ due to the disturbing currents without restricting the balancing facilities of the system. By a modified arrangement according to the invention, it is possible to dispense with the special lead, which is normally required to operate from station A the relays at station B.

Fig. 2 shows an arrangement in which variable resistances are inserted in each lead $a$ $b$ at points $x$, $y$. One of these resistances includes a variable self inductance L, the other is shunted by a variable capacity. By the proper adjustment of these factors the currents $i_1$ and $i_2$ due to the disturbing causes can be equalized both in phase and amplitude and the voltages $V_1$, $V_2$ across the receiving instrument are thus made equal and the disturbances thereby eliminated.

In Fig. 3 the connections at station B are similar to those shown in Fig. 1, but instead of inserting resistances, inductances and capacities in the lines, a bridge is arranged across the receiving instrument at station A, whose arms $l_1$, $l_2$ are connected to points $Z_1$, $Z_2$ and to earth, such arms comprising adjustable resistances $r_1$, $R_1$, $r_2$, $R_2$, of which $R_1$ and $R_2$ are shunted by variable capacities $C_3$ and $C_4$. By suitably adjusting the arms $l_1$ and $l_2$, the voltages $V_1$, $V_2$ due to disturbing currents, which find their way into the lines $a$, $b$, can be equalized. This arrangement allows, when suitably adjusted, of sending from station B without disturbing the receiving instrument.

We now proceed to describe means applicable to duplex working, whereby the disturbances are eliminated and at the same time the lines $a$, $b$ can be used for sending from station B, so that the special line from station A for operating the sending relays at station B is eliminated.

Referring to Fig. 4, the bridge arms at station A are similar to those shown in Fig. 3, but their vertex is connected through key T to earth. When one of the keys is depressed a battery $B_3$ is included in this connection to earth, the polarity direction of the sending current depending in the well known manner, on which lever is depressed.

At station B there is a corresponding earth connection to which are connected the coils of two oppositely polarized relays $A_1$ and $A_2$. These coils are connected in parallel by means of a conductor $c$ to the middle point of the windings $S_1$, $S_2$ of the secondary of a transformer which is connected directly across the lines $a$, $b$. The primary of the transformer consists of three coils $P_1$, $P_2$, $P_3$, which are connected directly across the working and artificial cables at the points $w_1$, $w_2$.

The action is as follows:—

On depressing one of the levers of the key T, current flows to the vertex of the bridge at A, flows through the leads $a$, $b$ in parallel, and in opposite directions through the coils $S_1$, $S_2$ and through the conductor $c$, and the coils of the relays $A_1$, $A_2$ to earth, thereby operating either the relay $A_1$ or the relay $A_2$ according to the polarity of the current, that is according to which lever of the key T was depressed. The currents in the two windings $S_1$, $S_2$ of the secondary coil being equal and opposite there will be no inductive effect on the primary coils $P_1$, $P_2$, $P_3$, and if the arms $l_1$, $l_2$ of the bridge at A are properly balanced, there will be no disturbance of the receiving instrument M. The relays $A_1$, $A_2$ send positive or negative currents respectively into the cables through the bridge arms $m$, $n$, in the usual manner. In this way sending can be effected without disturbing the receiving instrument and without an extra line for operating the relays, and at the same time disturbances of the instrument M due to extraneous causes are eliminated by suitable adjustment of the variables in the arms $l_1$, $l_2$.

At the same time a further advantage is offered by these arrangements because by suitable adjustment of the capacities $C_3$, $C_4$ and the resistances $R_1$, $R_2$, arranged in parallel therewith, the relays $A_1$, $A_2$ can be made to respond sharply to the movements of the key T. Moreover the fact that the condensers $C_3$ and $C_4$ are shunted by the resistances $R_1$ and $R_2$ insures that the discharge of these condensers shall take place through the resistances, instead of through the relay circuits.

The arrival currents from the cable flowing into the artificial cable through the primary windings $P_1$, $P_2$, $P_3$, induce corresponding currents in the secondary winding $S_1$, $S_2$, thereby operating the receiving instrument M.

The arms $l_1$, $l_2$ form a shunt to the receiving instrument M, but owing to their high resistance and the arrangement of the condensers $C_3$, $C_4$ in series for currents flowing in this path, very little current is shunted from the receiving instrument M.

Fig. 5 shows certain modifications in and additions to the arrangements at station A; the resistances $r_1$, $r_2$ are replaced by the primary windings $P_5$, $P_6$ of transformers, the secondary windings $S_5$, $S_6$ of which can be either connected across the receiving instrument M in series with the condenser $C_5$ and a resistance $r_4$ arranged in parallel, or can be short circuited by the switch shown.

Currents flowing over the leads $a$, $b$ in parallel will have no inductive effect on these secondaries, but any current flowing through the arms of the bridge in series, such as will be produced by a difference of potential at $V_1$, $V_2$, will produce an inductive effect on the secondary windings $S_5$, $S_6$, which will tend to prevent the arrival current from taking the path through the shunt. The same effect is produced by short circuiting the windings $S_5$, $S_6$.

If the balance at station B is imperfect, an improvement can be effected in the balance of the system by a suitable variation of the arms of the bridge at A.

Fig. 6 shows arrangements by which the advantages of Figs. 4 and 5 can be obtained and at the same time enable a "Heurtley" relay or other suitable instrument to be used for magnifying the received signals. As before, the secondaries $S_7$, $S_8$, corresponding to the secondaries $S_1$, $S_2$ in Fig. 4 are arranged in the form of a bridge whose vertex is at O and the corresponding primaries $P_7$, $P_8$ are normally connected, as shown by the dotted lines, with the points $w_1$, $w_2$ of the working and artificial cables respectively. Resistances $R_3$, $R_4$ shunted by condensers $C_6$, $C_7$ may be inserted in series with the secondaries $S_1$, $S_2$. When it is desired to use a "Heurtley" magnifier or other similar apparatus, the primaries $P_1$, $P_2$ are disconnected from the points $w_1$, $w_2$; and are short circuited upon themselves. The "Heurtley" coil H is thus connected across the points $w_1$, $w_2$; $g_1$, $g_2$, $g_3$, $g_4$ are the resistances in the bridge, of which $g_1$, $g_2$ are varied by the deflection of the coil H. $B_2$ is the battery connected across one diagonal of the bridge, the other diagonal of which is connected across the line $a$, $b$ at the points $x$, $y$.

The operation of sending takes place as described with reference to Fig. 4; the sending current flowing to the relays $A_1$, $A_2$, through $a$ $S_1$ and $b$ $S_2$ in parallel, produces no inductive effect on the primary windings $P_1$, $P_2$. Moreover, if the primaries $P_1$, $P_2$ are short circuited, as when the "Heurtley" relay is used, any tendency for the arrival current from the cable to flow through the lines $S_1$, $S_2$, which form a shunt to the receiving instrument is reduced.

If it is not desired to use the transformer action between the primary and secondary coils, $S_1$ and $S_2$ can be replaced by non-inductive resistances.

Having thus described the nature of the said invention and the best means we know of carrying the same into practical effect, we claim:—

1. Means for protecting duplex submarine cable systems, comprising a Wheatstone bridge having a receiving instrument in the diagonal thereof, variable resistances and variable capacities in parallel thereto in the adjacent arms of the bridge, and other arms of the bridge constituting a double line connecting the receiving instrument with the distantly located shore end of the working cable and the artificial cable.

2. Means for protecting duplex submarine cable systems, comprising a Wheatstone bridge having a receiving instrument in the diagonal thereof, variable resistances and variable capacities in parallel thereto included in the adjacent arms of the bridge, and other arms of the bridge constituting a double line connecting the receiving instrument with the distantly located shore end of the working cable and the artificial cable, over which double line the arrival currents are transmitted in series and the sending currents are transmitted in parallel.

3. Means for protecting duplex submarine cable systems, comprising a Wheatstone bridge having a receiving instrument in the diagonal thereof, variable resistances and variable capacities in parallel thereto included in the adjacent arms of the bridge, other arms of the bridge constituting a double line connecting the receiving instrument with the shore end of the working cable and the artificial cable, relays operative by sending currents transmitted in parallel over the said double line, and a transformer having said relays connected to the junction of its secondary windings and having its primary windings connected to the working and artificial cables.

4. Means for protecting duplex submarine cable systems, comprising a Wheatstone bridge having a receiving instrument in the diagonal thereof, variable resistances and variable capacities in parallel thereto included in the adjacent arms of the bridge, other arms of the bridge constituting a double line connecting the receiving instrument with the shore end of the working cable and the artificial cable and bridging the said double line at the cable end thereof, transformer windings connected in series with resistances, and capacities shunting the last-mentioned resistances.

5. Means for protecting duplex submarine cable systems, comprising a Wheatstone bridge having a receiving instrument in the diagonal thereof, variable resistances and variable capacities in parallel thereto included in the adjacent arms of the bridge, two arms of the bridge constituting a double line connecting the receiving instrument with the shore end of the working cable and the artificial cable, and transformer windings bridging the said double line so arranged that an inductive action occurs between the primary and secondary windings by the arrival but not by the sending currents.

6. Means for protecting duplex submarine cable systems, comprising a Wheatstone bridge having a receiving instrument in the diagonal thereof, variable resistances and variable capacities in parallel thereto included in the adjacent arms of the bridge, two arms of the bridge constituting a double line connecting the receiving instrument with the shore end of the working cable and the artificial cable, a transformer having its secondary windings bridging the said double line at the cable end thereof, the primary windings of the transformer normally bridging the working and artificial cables and capable of being short-circuited when the said working and artificial cables are bridged by a senstive relay.

7. Means for protecting a duplex submarine cable system, comprising a Wheatstone bridge having a receiving instrument in the diagonal thereof, resistances included in the adjacent arms of the bridge in parallel with variable capacities, coils also included in said arms, and secondary windings acted on inductively by said coils, said secondary windings bridging the terminals of the said receiving instrument.

8. Means for protecting a duplex submarine cable system, comprising a Wheatstone bridge having a receiving instrument in the diagonal thereof, resistances included in the adjacent arms of the bridge in parallel with variable capacities, coils also included in said arms of the bridge, and secondary windings acted on inductively by said coils and connected over a capacity, shunted by a resistance, with the terminals of the receiving instrument.

9. Means for protecting duplex submarine cable systems, comprising a Wheatstone bridge having a receiving instrument in the diagonal thereof, variable resistances included in the adjacent arms of the bridge, variable capacities in parallel with said resistances, two arms of the bridge constituting a double line connecting the receiving instrument with the shore end of the working cable and the artificial cable, transformer windings bridging the said double line, so arranged that an inductive action occurs between the primary and secondary windings by the arrival but not by the sending currents, and a switch for short-circuiting the said secondary windings on themselves when required.

In testimony hereof we have signed our names to this specification in the presence of two subscribing witnesses.

OSKAR MOLL.
PAUL KUSCHEWITZ.

Witnesses to the signature of Oskar Moll:
W. L. KNORR,
Jos. EULER.

Witnesses to the signature of Paul Kuschewitz:
ERNEST KATZ,
ERNEST H. BLEIST.

Copies of this patent may be obtained for five cents each, by addressing the "Commissioner of Patents, Washington, D. C."